United States Patent
Owoc et al.

(10) Patent No.: US 6,640,456 B2
(45) Date of Patent: Nov. 4, 2003

(54) LEVEL WITH ATTACHMENTS

(76) Inventors: Greg Owoc, 2435 E. North St., Greenville, SC (US) 29615; Tim Mika, 919 S. 14th Pl., Rogers, AR (US) 72758

( * ) Notice: Subject to any disclaimer, the term of this patent is extended or adjusted under 35 U.S.C. 154(b) by 0 days.

(21) Appl. No.: 09/728,125

(22) Filed: Dec. 4, 2000

(65) Prior Publication Data

US 2002/0069543 A1 Jun. 13, 2002

(51) Int. Cl.⁷ .............................. G01C 9/24; G01C 9/00; G01B 3/10

(52) U.S. Cl. .............................. 33/382; 33/760; 33/371; 33/381

(58) Field of Search .................... 33/382, 383, 381, 33/384, 760, 770, 370, 371, 372, 373, 365, 374, 379

(56) References Cited

U.S. PATENT DOCUMENTS

| | | | | |
|---|---|---|---|---|
| 312,266 A | * | 2/1885 | Gurley | 33/373 |
| 642,888 A | * | 2/1900 | Van Vliet | 33/353 |
| 1,435,365 A | | 11/1922 | Zieman | |
| 1,473,877 A | * | 11/1923 | Rome | 33/353 |
| 1,545,932 A | * | 7/1925 | Williams | 33/372 |
| 2,453,091 A | * | 11/1948 | Holloway et al. | 33/384 |
| 2,748,494 A | * | 6/1956 | Raney | 33/383 |
| 2,752,692 A | | 7/1956 | Smith | |
| 2,785,477 A | * | 3/1957 | Gregory | 33/372 |
| 3,114,507 A | | 12/1963 | Dommer | |
| 3,119,424 A | | 1/1964 | Henry | |
| 3,225,451 A | * | 12/1965 | Olexson et al. | 33/347 |
| 4,068,386 A | | 1/1978 | Streeter | |
| 4,189,844 A | | 2/1980 | Riggins, Sr. | |
| 4,228,588 A | * | 10/1980 | Horton et al. | 33/1 H |
| 4,438,538 A | | 3/1984 | Larsen | |
| 4,590,682 A | * | 5/1986 | Koch | 33/383 |
| 4,697,349 A | | 10/1987 | Lee | |
| 4,700,489 A | * | 10/1987 | Vasile | 33/342 |
| 4,829,676 A | * | 5/1989 | Waldron | 33/372 |
| 5,103,569 A | | 4/1992 | Leatherwood | |
| 5,119,521 A | | 6/1992 | Clontz | |
| 5,388,337 A | * | 2/1995 | Powers, II | 33/273 |
| 5,421,094 A | * | 6/1995 | McCord et al. | 33/373 |
| 5,430,952 A | | 7/1995 | Betts | |
| 5,581,900 A | * | 12/1996 | Payne | 33/370 |
| 5,881,468 A | * | 3/1999 | Baumann | 33/383 |
| D428,348 S | | 7/2000 | Hatfield et al. | |
| 6,088,862 A | | 7/2000 | Bulcock | |
| 6,131,298 A | * | 10/2000 | McKinney et al. | 33/372 |
| 6,332,277 B1 | * | 12/2001 | Owoc et al. | 33/373 |

FOREIGN PATENT DOCUMENTS

| | | | | |
|---|---|---|---|---|
| DE | | 3526018 A1 | * 1/1987 | 33/384 |

* cited by examiner

*Primary Examiner*—Diego Gutierrez
*Assistant Examiner*—Mirellys Jagan
(74) *Attorney, Agent, or Firm*—Bacon & Thomas, PLLC

(57) ABSTRACT

A level having a frame with a reference surface and a level sensor secured to the frame. The level includes one or more attachment devices that are detachably secured to the level. The one or more attachment devices may include a torpedo level, a second level sensor, a tape measure, a writing instrument, notepad, or other auxiliary device that may be used by a user of the level.

2 Claims, 6 Drawing Sheets

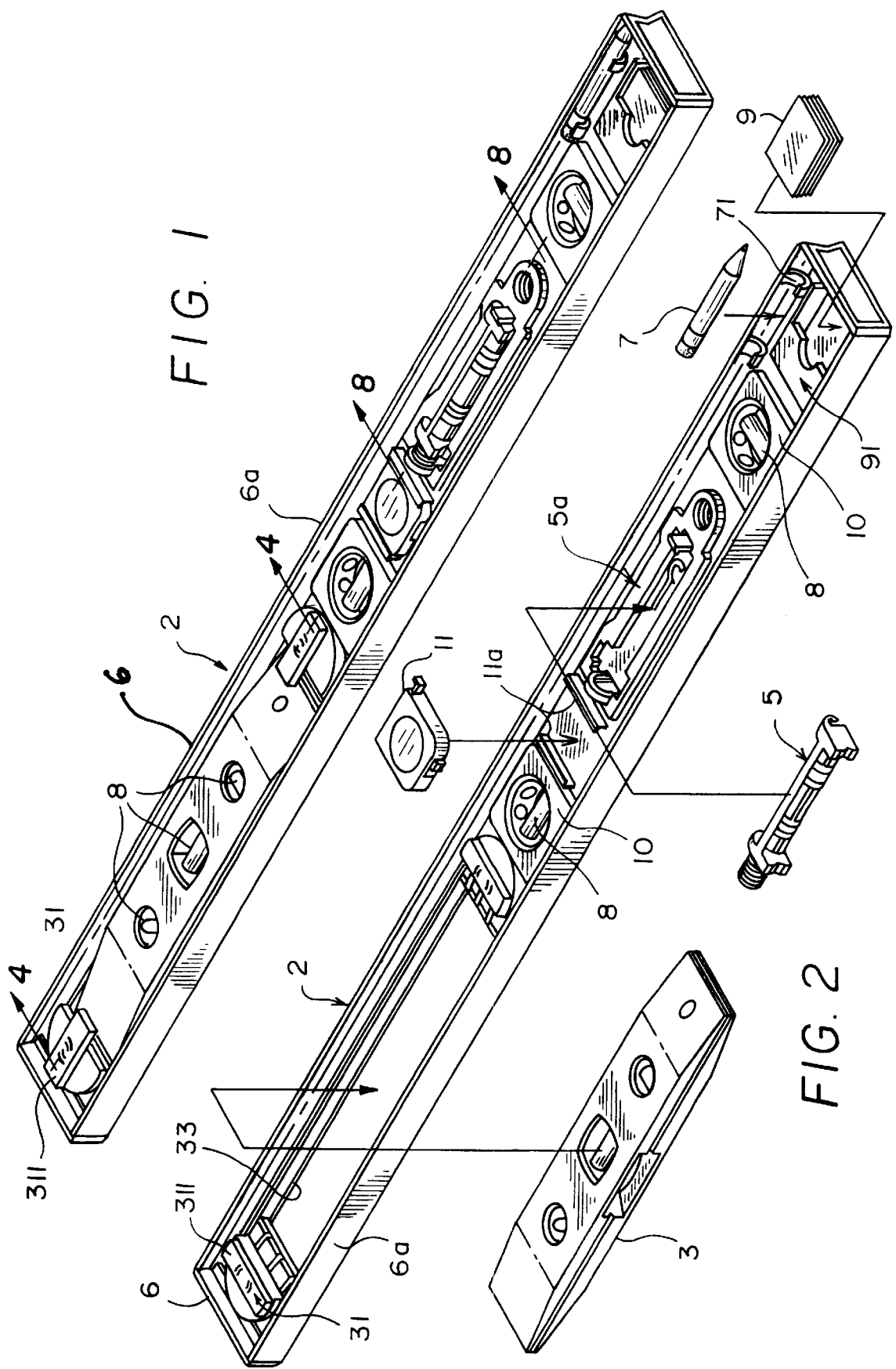

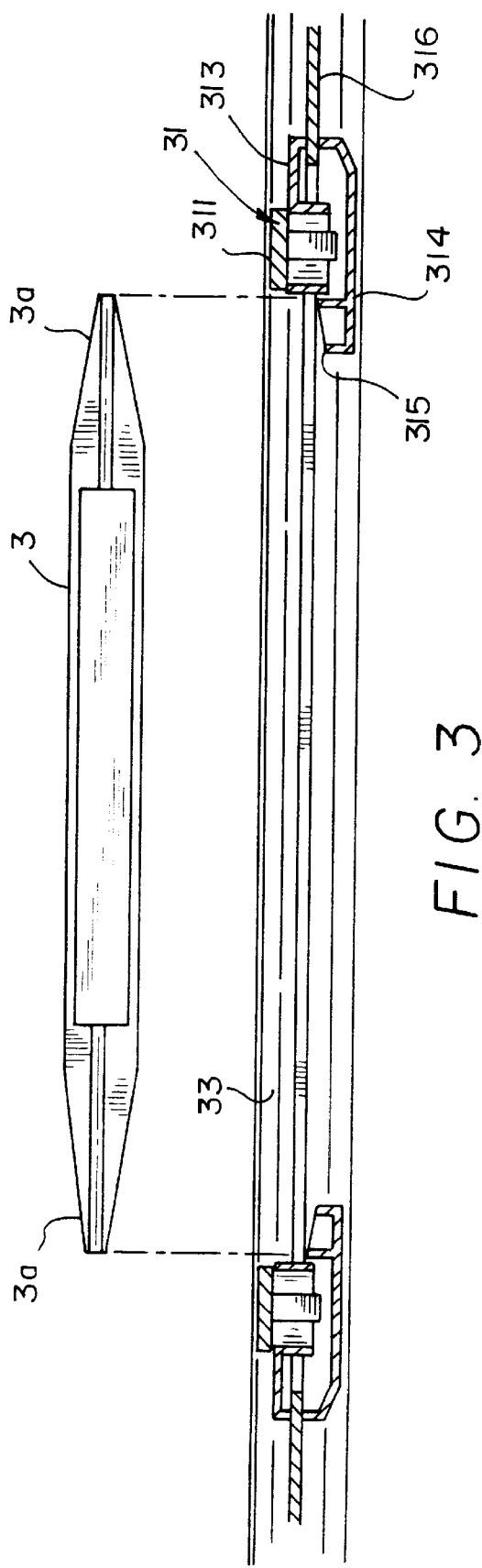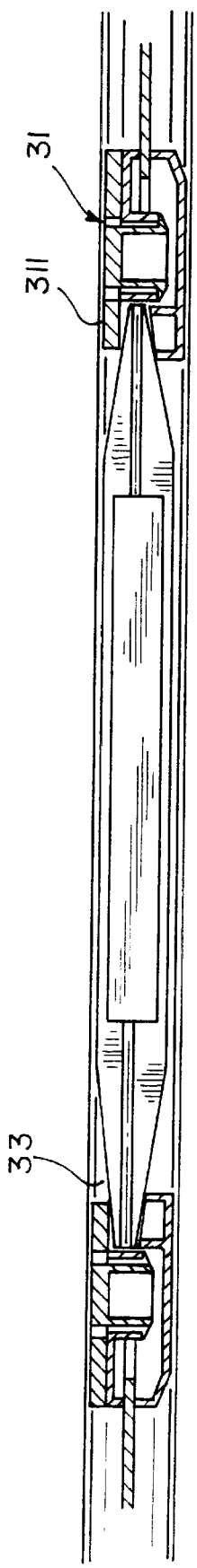
FIG. 3
FIG. 4

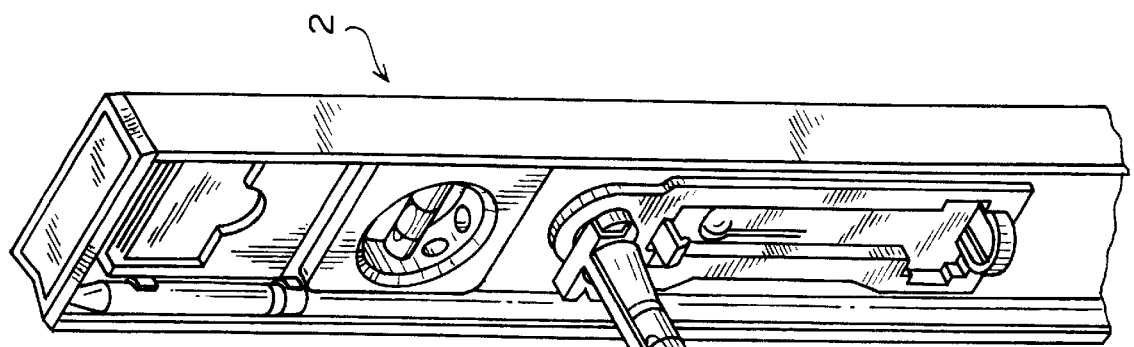
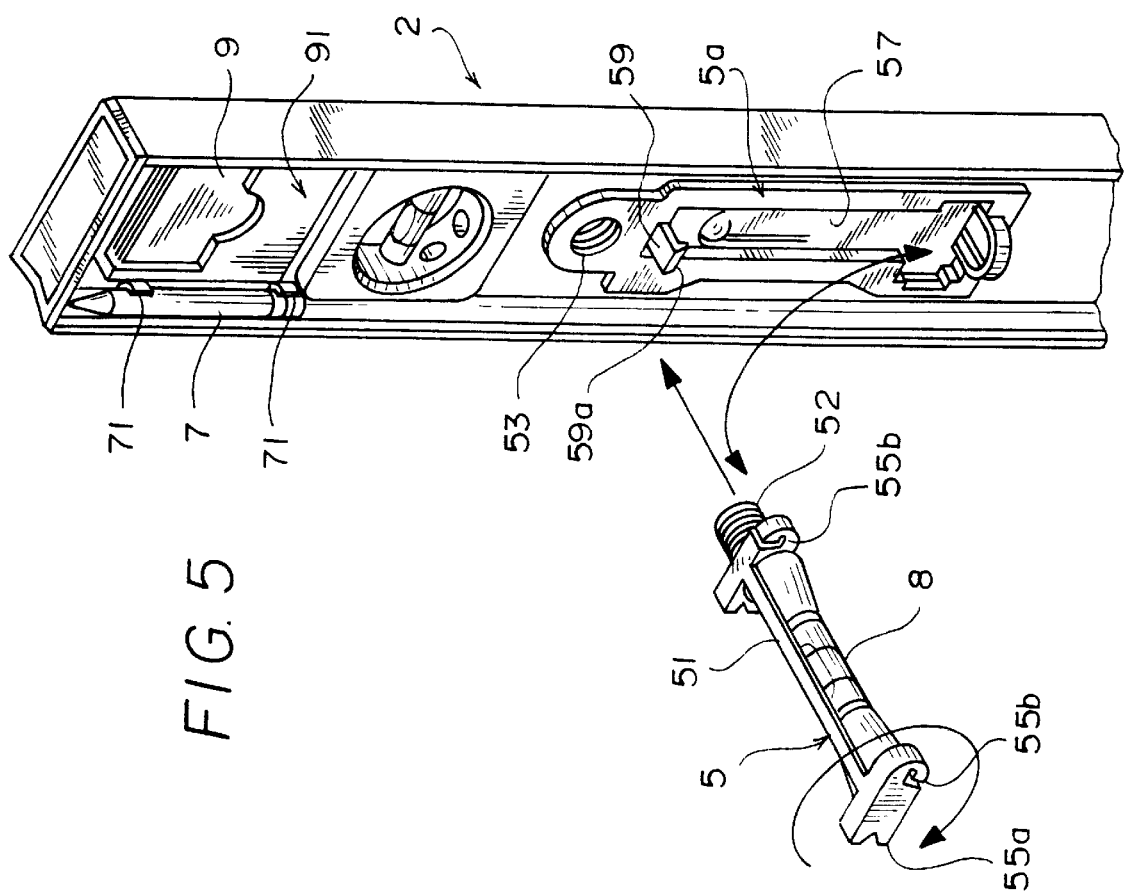

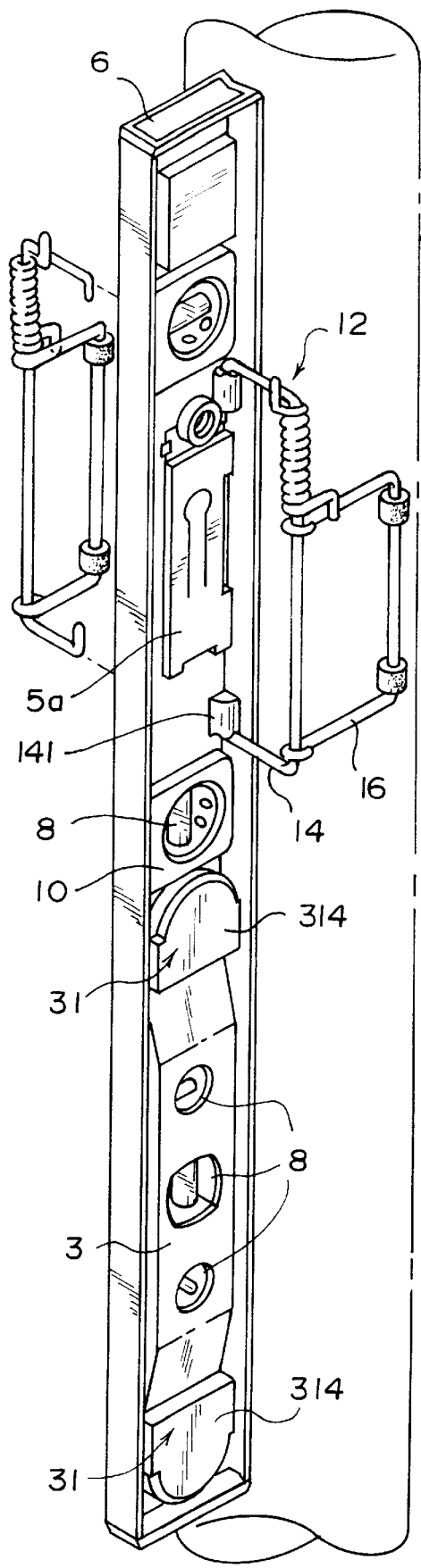
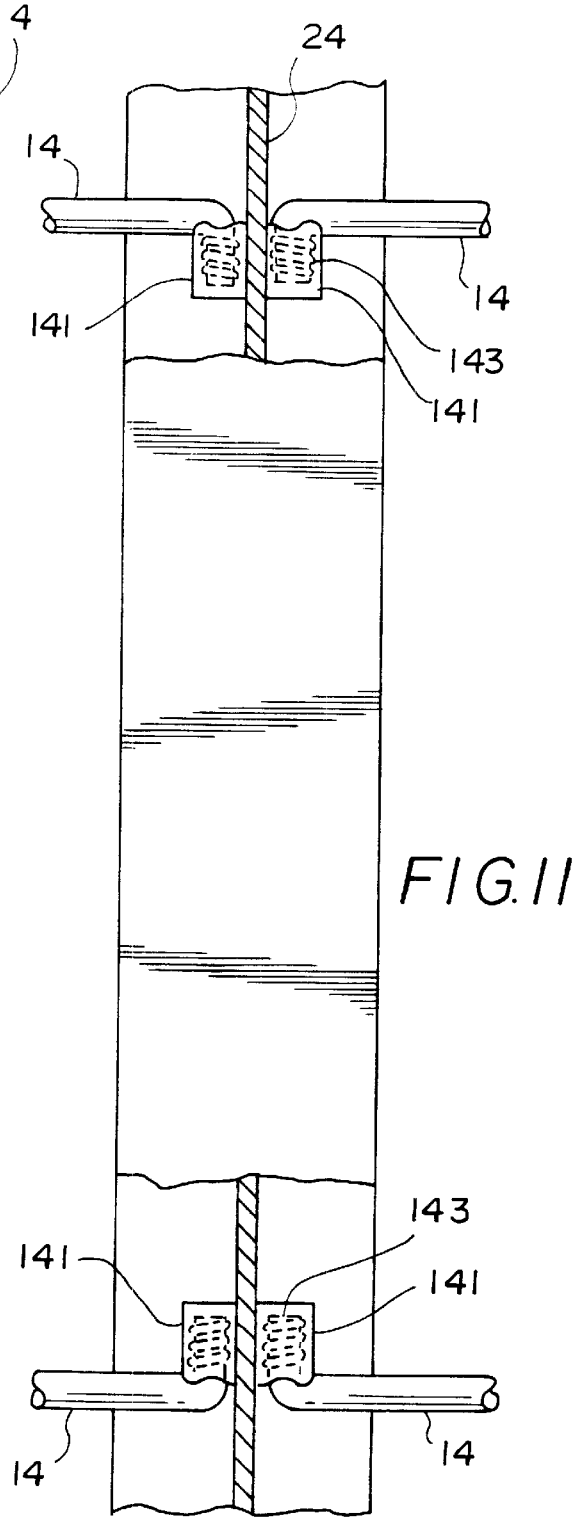
FIG. 10
FIG. 11

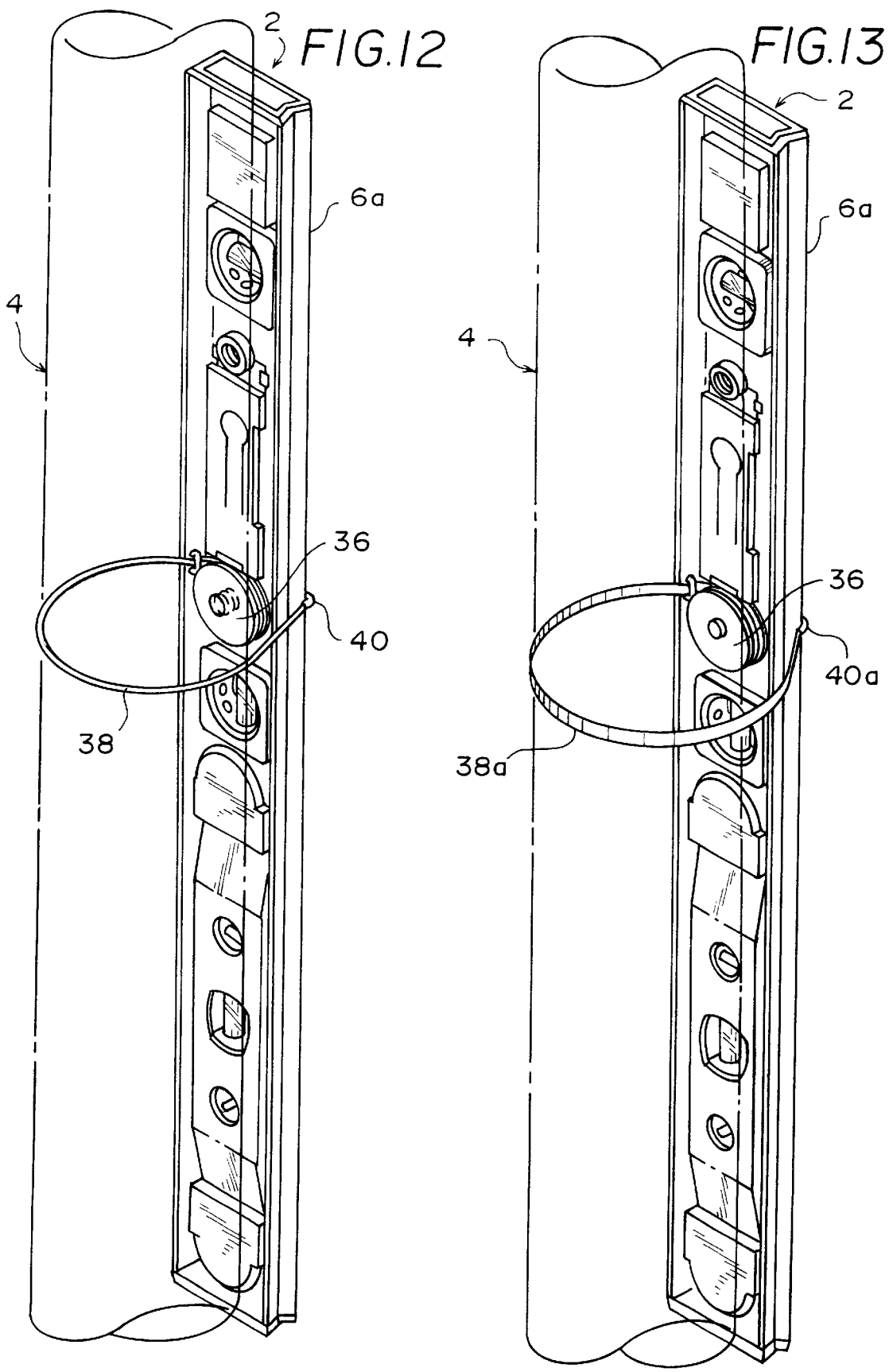

LEVEL WITH ATTACHMENTS

CROSS-REFERENCE TO RELATED APPLICATION

This application is related to U.S. application Ser. No. 09/347,450, filed Jul. 6, 1999. The earlier U.S. application (Ser. No. 09/347,450) is hereby incorporated by reference.

BACKGROUND OF THE INVENTION

1. Field of the Invention

The present invention relates to geometrical instruments, more particularly to levels and plumbs that are responsive to terrestrial gravitation, the level including various auxiliary attachments that generally can be used by the user of the level.

2. Description of the Related Art

When precise measurements are required to determine the true horizontal and vertical, level sensing devices are required. During any type of construction, many components must be precisely oriented from the true horizontal or vertical. For instance, most studs and posts must be vertical, floor joints generally must be horizontal, window and door frames generally are square, and gravity drainage systems must be adequately graded. The basic tools for ensuring that such components are properly oriented with respect to the true horizontal and vertical, are the level and the plumb.

The most common types of levels and plumbs are the bubble-type which use a sealed vial that is partially filled with a liquid. The resulting air bubble is used as an indicator of the orientation of the instrument based upon its position within the vial. The vial is generally secured to the measuring instrument at various angles that relate to the true horizontal and true vertical when the measuring instrument is oriented to either the true horizontal or vertical or any deviations therefrom. Generally, when the vial is in the horizontal position, the bubble therein will move to the center. When the vial is in a rotated position, the bubble will move toward the higher end of the vial since the liquid in the vial is heavier than the bubble. Levels and plumbs may appear using a variety of other technologies other than the standard bubble vials, for sensing and determining the true horizontal and vertical grades, including electronic measuring devices.

In practice, the common bubble vial or other level sensor, is mounted in a rigid frame of a measuring device or instrument in order to facilitate its positioning vis-a-vis a test surface that will be used as a standard in determining the true horizontal or vertical from the test surface. The two most common types of instruments for measuring the horizontal and vertical are the box frame and the I-beam frame levels which are named after the appearance of their transverse cross-sections. The orientation of the vial in the frame depends on the intended use of the instrument. For instance, if the device is intended for use in measuring the horizontal orientation of a test surface, then the vial is mounted parallel to the reference side of the frame and the tool is called a "level". Alternatively, when the vial is mounted perpendicular to the reference side of the frame of the measuring instrument, it can be used to measure the vertical orientation of a test surface and is called a "plumb". Generally, most such instruments are provided with both horizontal and vertical bubble vials, including bubble vials that are at selective angles from the reference side of the instrument, so that they can be used as both levels and plumbs and to measure other deviations from the horizontal and vertical.

The term "level" is now used very broadly and encompasses geometrical instruments for sensing both the horizontal and vertical and other angular grades.

During any type of construction, it is common for the worker to take various measurements and make notes before, during and after the construction of the project. Further, the worker has to carry various other instruments that assist in the making of such measurements or recordings. The worker had to carry the various devices, i.e., tape measure, pencil, notepad, torpedo level, detachable level sensor, etc. in various pockets of the worker's clothing or in a belt or bag that encumbers the worker by getting in the way of the worker.

There is a need for a device that neatly stores various useful construction devices as attachments within a level or similar shaped construction equipment.

SUMMARY OF THE INVENTION

The present invention provides a measuring instrument, such as a level, on which various auxiliary attachments can be secured in order to provide for ready access to frequently used instruments in a construction site. The measuring instrument or level of the present invention includes a frame having a reference surface, a level sensor typically in the form of a bubble vial, that is secured to the frame and one or more useful construction devices in the form of attachments secured on or within the level or measuring instrument. The various attachment (construction) devices are generally flush with the overall shape of the measuring device or level, such that the attachment devices will not be easily become entangled when the measuring device (level) is contacted by outside elements.

According to a preferred embodiment of the invention, the measuring instrument is a level on which various auxiliary attachment devices are attached within or on its frame. The various attachment devices preferably include a torpedo level, a detachable line and sensor level, a tape measure, a pencil, a paper holder with a paper pad, and attaching elements that secure the attachment devices to the measuring instrument or level. Other attachment devices are also envisioned as well and will be discussed further in the detailed description.

According to another embodiment of the present invention, the measuring instrument is a level having at least one articulated arm that is pivotally connected at one end to the frame of the measuring instrument or level for securing the reference surface of the measuring instrument to a test surface. According to yet another embodiment of the present invention, the measuring device in the form of a level includes a spooling device that spools or winds a band or belt having a hook device at its open end, such that the band or belt can be secured on or around a test surface.

Other embodiments and the details of the invention will become evident upon review of the following detailed description.

BRIEF DESCRIPTION OF THE DRAWINGS

In order to more fully explain the features and advantages of the present invention, the following preferred embodiments of a measuring instrument having attachments according to the invention are described, as examples only, without limitative character, with reference to the accompanying drawings, in which:

FIG. 1 is a perspective view of a measuring instrument in the form of a level with the various attachments that are secured on the measuring instrument;

FIG. 2 is an exploded view of the measuring instrument that shows the various attachments removed from the measuring device;

FIG. 3 is a partial side view of the level of FIG. 1 taken along lines 4—4 of FIG. 1, with one attachment device positioned outside of the measuring instrument;

FIG. 4 is a view similar to FIG. 3, with the attachment device locked within the measuring instrument;

FIG. 5 is a partial perspective view of the measuring device showing another attachment device, in the form of a detachable line level and sensor, that has been removed from the measuring instrument and is aligned for securing the detachable level sensor into the measuring instrument at a different orientation than the orientation for storing the attachment device, FIG. 5 also shows a writing instrument and related inscription devices that are secured within the measuring device;

FIG. 6 is a view similar to that of FIG. 5 except that the detachable level sensor is secured to the measuring device at a location that is different from the secured position of FIG. 1;

FIG. 10 is a perspective view of a measuring instrument in the form of a level that is securable on a vertical test member; and FIG. 11 is a partial top view, with cutaway portions of the measuring device shown in FIG. 10.

FIGS. 12 and 13 show an alternate embodiment of the invention.

DETAILED DESCRIPTION OF PREFERRED EMBODIMENTS

Figure 8:
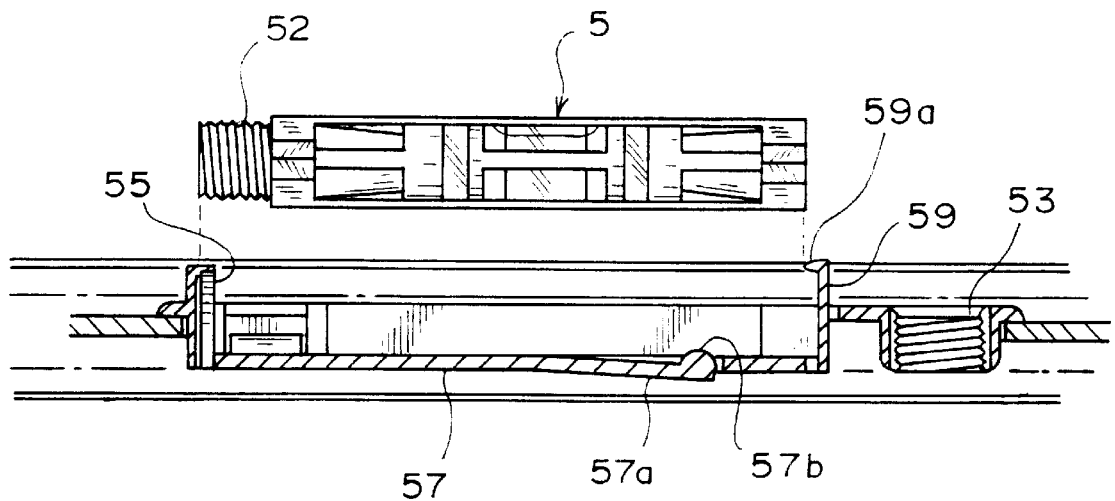
FIG. 8 is a view similar to that of FIG. 7, with an attachment device removed from its housing within the measuring instrument.

FIGS. 1–8 illustrate a measuring device, in the form of a level for illustrative purposes but it is envisioned that other measuring devices, such as a ruler or box structure could be used as the overall measuring instrument. The level 2 includes an I-beam frame 6 having a reference sides 6a or surfaces that are abuttable to the surface of a test member, i.e., a wall or a window frame. The other sides, surfaces, and edges of the frame 6 may also be used as reference surfaces, and other types of frames box frames, may also be used.

FIGS. 1–8 illustrate a measuring device, in the form of a level for illustrative purposes but it is envisioned that other measuring devices, such as a ruler or box structure could be used as the overall measuring instrument. The level 2 includes an I-beam frame 6 having a reference side or surface that is abuttable to the surface of a test member, i.e., a wall or a window frame. The other sides, surfaces, and edges of the frame 6 may also be used as reference surfaces, and other types of frames including box frames, may also be used.

The frame 6, as illustrated, shows at least two bubble vials arranged in various orientations along the length of the frame in site structures 10, however any other number and arrangement of the vials 8 may also be used. It should be noted that the bubble vials are mentioned merely as illustrative examples, and it is envisioned that various other level sensing devices including electronic level sensing devices may be used in combination or separate from the bubble vials in order to measure the various grades from the horizontal or vertical. The site structure 10 may be in the form of a plastic molding, for example, to which the bubble vial 8 is permanently secured for accurate positioning and easy mounting in the frame 6. In addition to the bubble vials 8 that are permanently secured into the site structures 10, various other attachments can be detachably attached to the level 6. FIG. 2 illustrates how various other attachments can be removed and secured on the level 6. The various other attachments may include a torpedo level 3, a tape measure 11 secured by holders 11a, a detachable level sensor 5, a writing instrument in the form of a pencil 7, a paper pad 9, and associated attachment securing devices that detachably secure the various attachment devices on or in the level 2.

FIGS. 3 and 4 illustrate how the torpedo level 3 or similarly shaped device is secured and detached from the frame 6 of the level 2. FIG. 4 illustrates that the torpedo level 3 is secured within an opening 33 in the I-beam frame 6. FIG. 4 is a partial side view of the level 2 of FIG. 1, wherein an attachment securing device 31 securely locks the torpedo level 3 within the I-beam frame 6 of the level 2. The torpedo level 3 is detachably secured within the level 2 by the attachment securing device 31. The attachment securing device 31 includes a latch 311 that swivels at an axis that is substantially perpendicular to the length of the level 2 when it is at a locked position, securing the torpedo level 3. The swivel latch 311 is pivotally secured to a frame 313. The frame 313 is connected to a lower base 314, with the frame 313 and the lower base 314 securing onto a frame attachment 316 that secures the attaching device 31 to the I-beam frame 6. The lower base 314 includes a rest surface 315.

FIG. 4 illustrates the torpedo level 3 secured within the I-beam frame 6, wherein the swivel latch 311 is rotated in a locked position, as shown in FIG. 1, such that the end portions 3a of the torpedo level 3 are secured between the outer edges of the swivel latch 311 and the rest portion 315 of the attaching device 31. FIG. 3 shows the torpedo level 3 outside of the I-beam frame 6. The torpedo level 3 is removable when the swivel latch 311 is pivoted in the release position, as shown in FIG. 2, such that the outer edges of the swivel latch 311 are turned away from the end portions 3a of the torpedo level 3. The attachment device 31 is illustrated as a swivel latch, merely as an example, but it is envisioned that other equivalent attachment devices may be used to secure the torpedo level 3, or similarly shaped devices within or on the level 2. In addition, the torpedo level 3 may be attached to the I-beam frame 6 by friction-fit, in the manner similar to that which attaches other devices to the level 2, as shown in the illustrations of FIGS. 5—7.

FIGS. 5 and 6 illustrate the removal and reattachment of the detachable level sensor 5 from the level 2. FIG. 5 illustrates the removal of the detachable level sensor 5 from its secured or storage position in FIG. 1. The frame 51 of the detachable level sensor 5 includes two end portions with a level sensor 8 located therebetween. The end portions include line receiving grooves 52, 55a, 55b to enable the sensor 5 to be used as a conventional line level. The first end 52 of the detachable level sensor 5 is securable onto the threaded receiver of the housing 5a for the detachable level sensor 5. The housing 5a for the detachable level sensor 5 is secured onto the I-beam frame 6. The second end 55a of the detachable level sensor 5 is securable onto a recessed holder 55 of the housing 5a of the detachable level sensor 5. The detachable level sensor 5 is securable on its housing 5a by a friction fit between the recessed holder 55 that secures the second end 55a of the detachable level sensor 5 and the tab 59 of the housing 5a of the detachable level sensor 5. The tab 59 includes a lip 59a that further secures the first end 52 of the detachable level sensor 5 in conjunction with the recessed holder 55 for the second end 55a. When the tab 59 of the housing 5a is bent away from the first end of the detachable level sensor 5, the detachable level sensor 5 may be removed from its housing 5a.

FIG. 6 illustrates how the detachable level sensor is secured onto its housing 5a. In this case, the first end 52 of the detachable level sensor 5 includes male threads that are securable onto the receiver 53 of the housing 5a with the receiver 53 illustrated as having female threads. In FIG. 6, the first end 52 of the detachable level sensor 5 is attached to the receiver 53 of the housing 5a. The male-female threading orientation between the detachable level sensor and its housing 5a may be reversed with minor modification. Further, other attaching devices that are well-known in the art may be used to attach the detachable level sensor 5 or similarly sized and configured devices to the housing 5a. In order to further strengthen the attachment of the first end 52 of the detachable level sensor 5, it is envisioned that a cylindrical sleeve (not shown) may extend from the first end 52 of the detachable level sensor 5, radially apart from threads, towards the receiver 53 of the housing 5a, and the receiver 53 include female threaded projections (not shown), such that the male threads of the first end 52 can be threaded onto the female threads of the receiver 53, with the cylindrical sleeve surrounding the female threaded projections of the receiver 53, the combination of the projected female threads of the receiver 53 and the extended sleeve of the first end 52 providing a stronger fit between the detachable level sensor 5 and the housing 5a. Variations of such structures to strengthen the fit between a detachable element and the frame 6 are envisioned.

Figure 7:
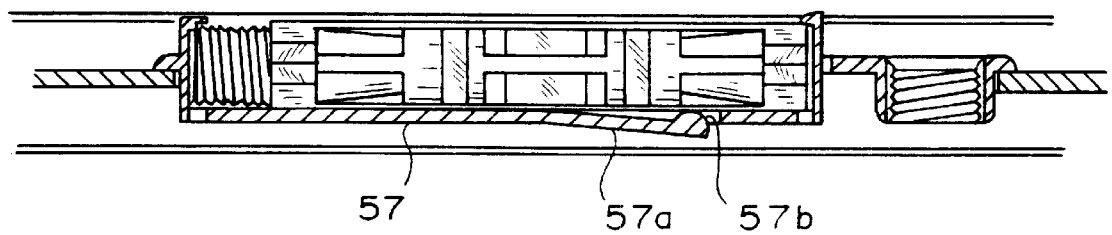
FIG. 7 is a partial side view of the measuring device of FIG. 1 taken along lines 8—8 of FIG. 1, and shows an attachment device secured to the measuring instrument.

FIGS. 7 and 8 further illustrate how the detachable level sensor 5 is secured within the I-beam frame 6 of the level 2. The detachable level sensor 5 can be removed from its housing 5a when the tab 59 is flexed away from one of the ends of the detachable level sensor 5 and the lip 59a of the tab 59 no longer provides sufficient frictional barrier for the removable of the detachable level sensor 5. The housing 5a for the detachable level sensor 5 includes a base 57, that includes a flexible tongue 57a with a free end having a lip 57b. When the detachable level sensor 5 is secured within the I-beam frame 6, the lip 57b of the flexible tongue 57a may rest on a side of the detachable level sensor 5. When the flexible tongue 57a is pushed from the underside of the I-beam frame 6 towards the detachable level sensor 5, the lip 57b of the flexible tongue 57a can force the detachable level sensor 5 out of its secured position within the I-beam frame 6, by providing sufficient force to flex the tab 59, including its lip 59a away from one of the ends of the detachable level sensor 5. Such a release mechanism is for illustrative only and it is envisioned that other release mechanisms that are well-known in the art can be used to release the detachable level sensor 5 or similarly shaped devices, for example, a spring-biased release device (not shown).

The level sensor 5 also may be used as a line level by means of the notches 55b in the ends of holder 55.

Figure 9:
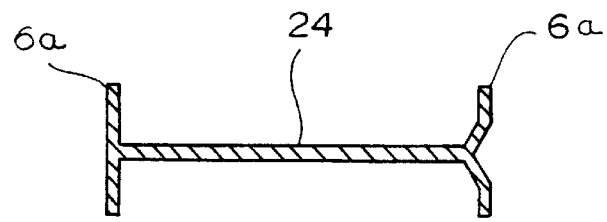
FIG. 9 is a cross-sectional view of the I-beam frame of the measuring instrument.

FIG. 9 is a cross section of the I-beam frame 6, and illustrates the free space that may be available within the level 2 for the storage of various attachments. It will be noted that in all embodiments of the invention, the attachment devices all fit within the frame 2, that is they do not extend beyond the edges 6a of the I-beam frame.

FIGS. 10 and 11 illustrate a measuring instrument in the form of a level 2 that is similar to that illustrated in FIGS. 1–8, with the addition of an articulated arm assembly 12 that is attached to the I-beam frame 6. The frame 6 includes an articulated arm or arm assembly 12 on each side of the level 2 for releasably securing the level to a test member 4, such as a pole or other element from which the measuring device in the form of a level 2 may be attached to. Such articulated arm assemblies 12 include a U-shaped inner member 14 and a U-shaped outer member 16, preferably formed from wire rod. The inner member 14 and/or outer member 16 may also be substantially straight or L-shaped. However, the bottom cross-piece extending between each side of the outer U-shaped member 16 allows for the arm assembly 16 to be more easily unfolded. Other materials besides wire rod, such as plastic or wood may also be used and the members 14 and 16 may also be produced using other manufacturing processes besides rod bending.

The top or open end of each U-shaped inner member 14 is pivotally connected to the level 2 by housings 141 onto which the ends of the U-shaped inner member 14 secure on to. The housing 141 for the articulated arm assembly 12 may be integrally formed with the I-beam frame 6 of the level 2, as illustrated in FIGS. 10 and 11 or securely attached as a separate component. For example, the invention could be provided as a kit with an independent arm assembly 12 and/or attachable housings 141 which can be easily retrofitted onto the level.

The articulated arm assemblies 12 function to secure the level 2 onto a test member 4.

The housings 141 include holes, one for each of the free ends of the U-shaped inner member such that the ends of the U-shaped inner members 14 are secured within the holes of the housing 141, as illustrated in FIG. 11. Each member 14 is biased, or urged to rotate into a folded position against the frame 6. For example, the ends of the U-shaped inner members 14 may be provided with a torsional spring 143 which will urge the inner member 14 to rotate out of the page of FIG. 11 and press against the webbing 24 (shown in FIG. 9) of the frame 6. The rotational springs may be loaded with about six to ten foot-pounds of initial torque, or six to ten pounds of initial opening force or other sufficient force. Numerous other structures that are well-known in the art may also be used for rotationally biasing the inner members 14 against the frame 6. The inner and outer members 14 and 16 (and/or their pivoting connections) may also be made sufficiently resilient so that the members will clamp against a test member 4 without using springs.

FIGS. 12 and 13 show yet another embodiment of the present invention. This embodiment is similar to that of FIGS. 10 and 11, except that instead of an articulated arm assembly, the device that attaches to a test member 4, is a take-up wheel or spool 38, 38a which is attached to an end of a band or belt 38, 38a, with the free end of the winding band or belt 38, 38a having a hooking device 40, 40a. The spool 36 may be permanently or detachably secured to the frame 6. The band or belt 38, 38a is unwound from the take-up wheel or spool 38 and extended around a test member 4, and the hook device 40, 40a is secured onto the level 2. The invention may include more than one take-up wheel or spool 36, in which case, the hooking device may be attached near the middle of a single continuous band extending between each of the spools (not shown). The spools 36 may have various forms such as wheels, discs, reels, or pins upon which the bands or belts 38, 38a are wrapped. The spools 36 are preferably rotatably attached to the frame webbing 24 which connects the flanges of the I-beam frame 6. However, the spool or spools 36 may also be fixed to the frame 6. The spool or spools 36 may include knobs (not shown) on their outer surface for manually winding one or more of the bands or belts 38, 38a. Alternatively, the spool or spools 36 may include a spring-loaded, motor-driven, ratcheted and/or other winding mechanisms for automatically winding the bands or belts 38, 38a. The band or belt 38, 38a may be in the form of elastic bands, cables, filaments, strings, wires, ropes, chains, and/or other structures. The hook 40, 40a is preferably formed from wire rod and has a loop, or other fastener, and permanently attaches to the end of the band or belt 38, 38a that is not attached to the spool 36. The purpose of the spool 36 and band or belt arrangement, with the hook 40, 40a is to attach the level 2 to a test member at a particular grade from the horizontal or the vertical, as measured by the level sensor 8.

The various attachments that are removably attached to the level 2, may include other devices other than those illustrated in the drawings. For instance, any device that is helpful to a worker on a construction site and fits neatly within or on the level 2 may be secured on the level 2. Further, the present invention is not limited to usage with a level 2, but encompasses other similarly shaped objects, for instance, a ruler or a box-shaped container. Additional attachments that are useful in a construction site and are shaped and configured to be attached in or on the measuring device, or the level 2, are securable on the measuring device. For instance, various electronic tools such as a dictation machine, mini-scanner, laser measuring device, etc., may be detachably attached on the measuring device in the form of a level 2 or similar shape. In FIGS. 1, 2, 5 and 6, a writing instrument in the form of a pencil 7 is frictionally attached on its housing 71 to the level 2. In addition, the level 2 provides for a holder 91 for a paper pad or paper 9. Other writing instruments are envisioned, i.e., an electronic marker, in conjunction with an electronic writing pad that could easily be secured on the level 2.

Another attachment that is envisioned is a mini-notepad or a miniaturized personal computer with a display that can be easily mounted on the level 2, for instance on the space where the torpedo level 3 is attached.

In the operation of the device of the present invention, the various attachments that are secured on the measuring device in the form of a level may conveniently be detached and used by a worker and placed back into or on the level 2 or similarly shaped device so that such attachments are not lost or damaged during construction. The present invention is by no means restricted to the above-described preferred embodiments, but covers all variations that might be implemented by using equivalent functional elements or devices that would be apparent to a person skilled in the art, or modifications that fall within the spirit and scope of the appended claims.

We claim:

1. A level comprising an elongate I-beam shape frame including a central web spanning side reference surfaces, said web including openings therethrough; a site structure including a bubble vial mounted in at least one of said openings; at least one other level sensing device detachably mounted in another opening in said web; said at least one other level sensing device not extending transversely beyond said side reference surfaces when mounted in its respective opening;

and including an articulated, spring-biased arm assembly pivotally attached to said web and arranged so as to be engageable with the opposed sides of a structure to be measured by using the level and to secure the level on said structure.

2. A level comprising an elongate I-beam shape frame including a central web spanning side reference surfaces, said web including openings therethrough; a site structure including a bubble vial mounted in at least one of said openings; at least one other level sensing device detachably mounted in another opening in said web; said at least one other level sensing device not extending transversely beyond said side reference surfaces when mounted in its respective opening;

two level sensing devices detachably mounted in respective openings in said web; both of said level sensing devices not extending transversely beyond said side reference surfaces when mounted in their respective openings;

wherein one of said level sensing devices comprises a torpedo level and the other level comprises a line level; and including a flexible tongue mounted within the respective opening in which said line level is located, said flexible tongue arranged to normally bias said line level is located, away from said opening when the line level is detachably mounted in said opening; and a latch device associated with the respective opening in which said line level is located, said latch device normally retaining said line level in its respective opening against the bias of said flexible tongue.

* * * * *